(12) United States Patent
Carlson et al.

(10) Patent No.: US 7,865,760 B2
(45) Date of Patent: *Jan. 4, 2011

(54) USE OF T4 TIMESTAMPS TO CALCULATE CLOCK OFFSET AND SKEW

(75) Inventors: Scott M. Carlson, Tucson, AZ (US); Michel H. T. Hack, Cortlandt Manor, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 12/245,303

(22) Filed: Oct. 3, 2008

(65) Prior Publication Data

US 2009/0037758 A1 Feb. 5, 2009

Related U.S. Application Data

(63) Continuation of application No. 11/223,577, filed on Sep. 9, 2005, now Pat. No. 7,475,272.

(51) Int. Cl.
  G06F 1/04 (2006.01)
  G06F 11/00 (2006.01)
  H04J 3/06 (2006.01)
(52) U.S. Cl. .................. 713/503; 713/500; 370/503; 707/100
(58) Field of Classification Search ............ 713/500, 713/503; 370/503; 707/100
See application file for complete search history.

(56) References Cited

U.S. PATENT DOCUMENTS

| 6,661,810 | B1 | 12/2003 | Skelly et al. |
| 6,957,357 | B2 | 10/2005 | Liu et al. |
| 7,103,514 | B1 | 9/2006 | Carlson et al. |
| 7,194,649 | B2 | 3/2007 | Liu et al. |
| 7,257,133 | B2* | 8/2007 | Jeske et al. ............ 370/507 |
| 7,475,272 | B2* | 1/2009 | Carlson et al. ........... 713/503 |

(Continued)

OTHER PUBLICATIONS

Mills, D., "Internet Time Synchronization: The Network Time Protocol", IEEE Transactions on Communications, Oct. 1991, pp. 1485-1486.

(Continued)

*Primary Examiner*—Vincent T Tran
(74) *Attorney, Agent, or Firm*—Scully, Scott, Murphy & Presser, P.C.; John E. Campbell

(57) ABSTRACT

Disclosed are a method and system for calculating clock offset and skew between two clocks in a computer system. The method comprises the steps of sending data packets from a first processing unit in the computer system to a second processing unit in the computer system, and sending the data packets from the second processing unit to the first processing unit. First, second, third and fourth time stamps are provided to indicate, respectively, when the packets leave the first processing unit, arrive at the second processing unit, leave the second processing unit, and arrive at the first processing unit. The method comprises the further steps of defining a set of backward delay points using the fourth time stamps, and calculating a clock offset between clocks on the first and second processing units and clock skews of said clocks using said set of backward delay points.

18 Claims, 2 Drawing Sheets

U.S. PATENT DOCUMENTS

| | | |
|---|---|---|
| 2002/0015485 A1* | 2/2002 | Bhusri .................. 379/220.01 |
| 2002/0120416 A1 | 8/2002 | Lin et al. |
| 2002/0176525 A1 | 11/2002 | Yamaguchi et al. |
| 2002/0188881 A1 | 12/2002 | Lin et al. |
| 2003/0031284 A1 | 2/2003 | Ishida et al. |
| 2003/0035444 A1 | 2/2003 | Zwack |
| 2003/0142696 A1* | 7/2003 | Holmeide et al. ........... 370/508 |
| 2005/0234927 A1 | 10/2005 | Bande et al. |
| 2006/0126437 A1* | 6/2006 | Smith ......................... 368/46 |
| 2007/0061607 A1 | 3/2007 | Carlson et al. |
| 2007/0086490 A1 | 4/2007 | Carlson et al. |

OTHER PUBLICATIONS

Moon, S., et al., "Estimation and Removal of Clock Skew from Network Delay Measurements", Department of Computer Science, University of Massachusetts, 1999, pp. 1-8.

Paxson, V., "On Calibrating Measurements of Packet Transit Times", Network Research Group, University of California, Berkeley, 1988, pp. 11-21.

* cited by examiner

USE OF T4 TIMESTAMPS TO CALCULATE CLOCK OFFSET AND SKEW

CROSS REFERENCE TO RELATED APPLICATIONS

The present application is a continuation application of U.S. patent application Ser. No. 11/223,577, filed Sep. 9, 2005. This application is related to copending application Ser. No. 11/223,878 for "Clock Filter Dispersion," filed Sep. 9, 2005; application Ser. No. 11/223,876 for "Method And System For Clock Skew And Offset Estimation," filed Sep. 9, 2005; and application Ser. No. 11/223,730 for "Filter Turning Point Detection," filed Sep. 9, 2005, now U.S. Pat. No. 7,103,514, issued Sep. 5, 2006. The disclosures of the above-identified applications are herein incorporated by reference in their entireties.

BACKGROUND OF THE INVENTION

1. Field of the Invention

This invention generally relates to computer systems, and in particular to time synchronization in computer systems. Even more specifically, the invention relates to methods and systems for calculating clock offset and skew between two clocks in a computer system.

2. Background Art

Modern computers use clocks for many purposes, including ensuring that many operations occur in the proper sequence or in synchronization. Because of this, it is important that the clocks themselves operate in close synchronization. Typically, two clocks are often not in perfect synchronization, and there are timing differences between the clocks. In addition, two clocks may not operate at the exact same frequency, so that the timing difference between the clocks changes over time. This change in the timing difference between the clocks is referred to as the clock skew.

Many computer-timing protocols require information such as the estimation of the skew and offset between two clocks. These two clocks may be, for example, a local clock and its source clock. For example, the Server Timing Protocol (STP) requires the estimation of the skew and offset between the local clock and the clock source. The accuracy of the estimation is crucial for the synchronization accuracy of the protocol. While methods and systems to measure clock skew are known, these known procedures tend to be quite complex, unreliable in certain situations, or both.

SUMMARY OF THE INVENTION

An object of this invention is to provide an improved procedure for estimating the clock skew and offset between two clocks in a computer system.

Another object of the present invention is to use both forward delay and backward delay to estimate the skew and offset between two clocks in a computer system.

These and other objectives are attained with a method and system for calculating clock offset and skew between two clocks in a computer system. The method comprises the steps of sending data packet from a first processing unit in the computer system to a second processing unit in the computer system, and sending the data packets from the second processing unit to the first processing unit. First time stamps are provided to indicate when the packets leave the first processing unit, second time stamps are provided to indicate when the packets arrive at the second processing unit, third time stamps are provided to indicate when the packets leave the second processing unit, and fourth time stamps are provided to indicate when the packets arrive at the first processing unit.

The method comprises the further steps of defining a set of backward delay points using the fourth time stamps, and calculating a clock offset between clocks on the first and second processing units and clock skews of said clocks using said set of backward delay points. Preferably, the set of backward delay point is comprised of $\{T4(i), -BD(i)\}$ where $T4(i)$ are the fourth time stamps, and $-BD(i)$ are backward delay values.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
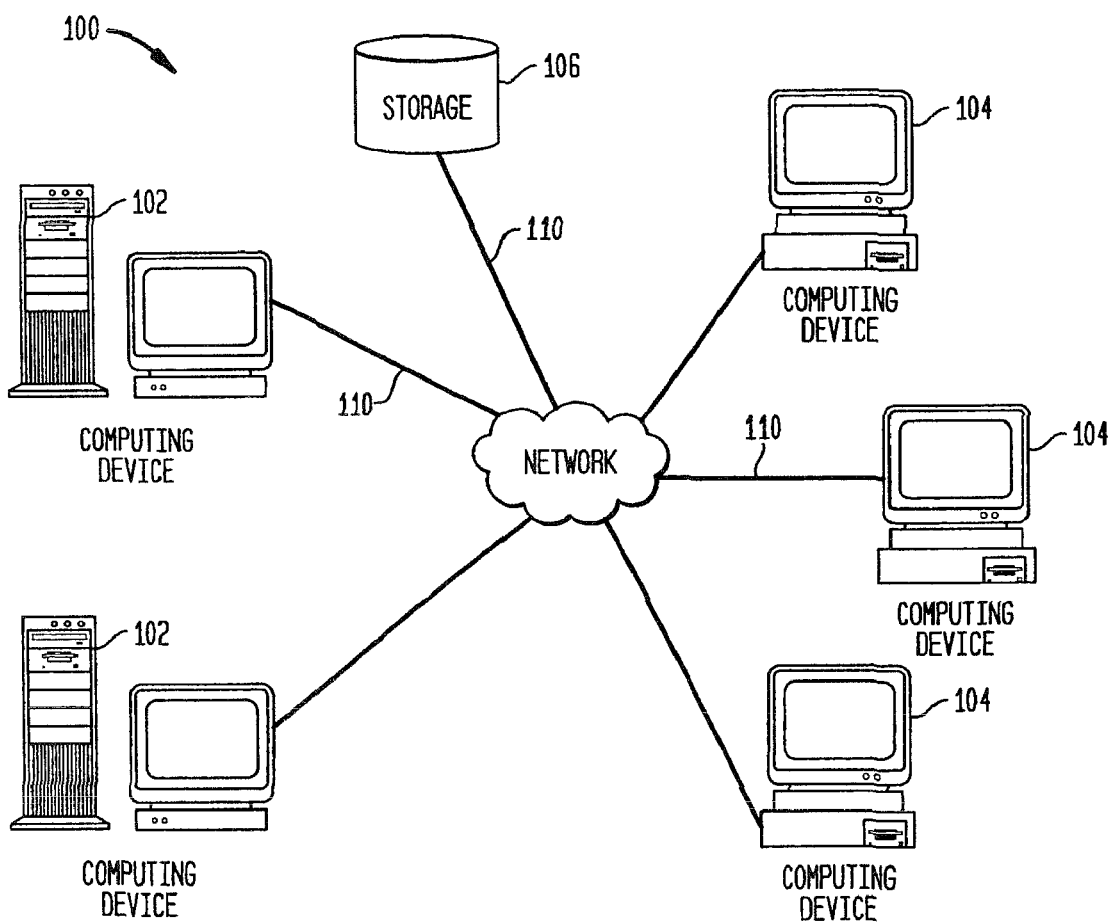
FIG. 1 illustrates a network of data processing systems in which the present invention may be implemented.

FIG. 1 illustrates a computer network 100, including servers 102, clients 104 and data storage unit 106. Network 100 also includes data connections 110 for transmitting data between the devices of the network. Network 100 may be, for example, the Internet, but could also be an intranet, a local area network a wide area network, point-to-point links, or other networks.

As mentioned above, various computer timing protocols, including the Server Timing Protocol (STP), require calculating the skew and offset between two clocks in computer systems or networks, such as network 100. The present invention is directed to obtaining the clock skew and offset.

Figure 2:
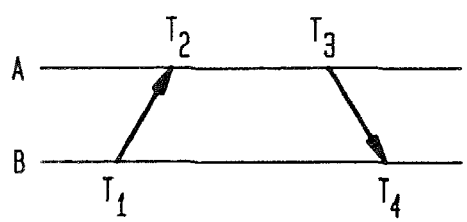
FIG. 2 illustrates a packet exchange between a clock machine B and a clock server A in the network of FIG. 1.

Reference is first made to FIG. 2, which illustrates a packet exchange between a local machine B and a clock server A. The packet leaves B at time T1, according to B's clock. The packet arrives at A at time T2, according to A's clock. Machine A then sends a reply packet at time T3, according to A's clock. The reply message reaches B at time T4, according to B's clock. By sending out this kind of exchange message regularly and recording the sequence of T1, T2, T3, T4 timestamps, one cam obtain estimates of the relative offset and speed difference between the clock of machine B and the clock of machine A.

Procedures are known that compute a sequence of forward and backward delays, (FD and BD) from the sequence of T1, T2, T3, T4 timestamps. For example, such procedures are described in U.S. patent application Ser. Nos. 09/920,138 and 10/157,610 and in U.S. Pat. No. 6,661,810. In particular, $$FD=T2-T1, BD=T4-T3.$$

Let's use $T1(i)$, $T2(i)$, $T3(i)$, $T4(i)$, $FD(i)$ and $BD(i)$ to denote the timestamps and delays for the $i^{th}$ packet exchange. Prior arts constructs two sets of delay points in the two dimensional plane, $\{(T1(i), FD(i)) | i=1, \ldots\}$ and $\{(T1(i), BD(i))$

|i=1, ... }. U.S. Pat. No. 6,661,810 considers the two sets of points independently, which may not yield accurate results as the present invention. U.S. patent application Ser. Nos. 09/920,138 and 10/157,610 consider the two sets of delay points jointly, which yield better accuracy than U.S. Pat. No. 6,661,810.

Use T4 Values with Backward Delay

In accordance with the present invention, the T4 timestamp is used to define the set of backward delay points, namely, {(T4($i$), -BD($i$))|i=1, ... }. Also, the two sets of delay points are considered jointly to obtain better estimates of clock offset and dispersion. Furthermore, the two sets of delay points are considered jointly, in a symmetric way. This symmetric treatment is an advance to the methods in patent application Ser. Nos. 09/920,138 and 10/157,610.

Although the package delays should be non-negative in real life, it is possible to have delay estimates to be negative if only the T1 timestamps are used. Possible problems due to apparent negative delay can be alleviated by using the T4 timestamp for the backward delay. This advantage will be described through an example. In this example, there is a relatively long delay between T3 and T2.

Figure 3:
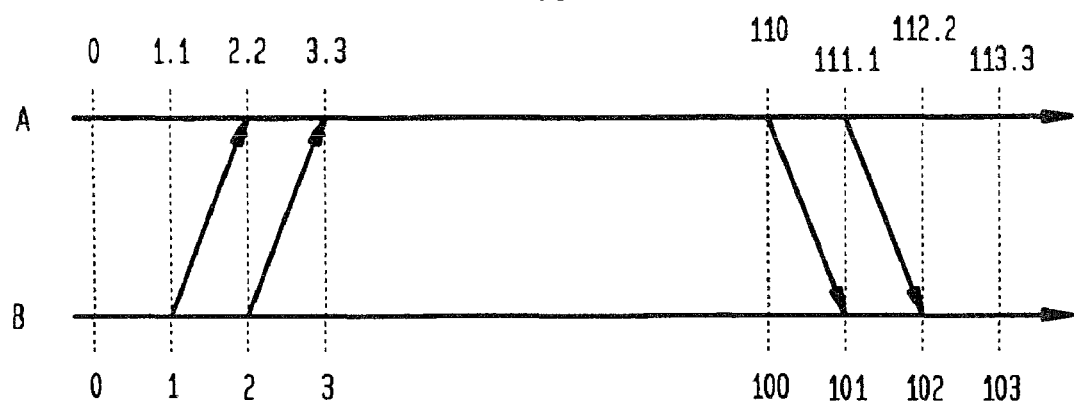
FIG. 3 illustrates a packet exchange between clock machine B and clock server A when clock A is running 10% faster than clock B.

With reference to FIG. 3, suppose clock A is running 10% faster than clock B. All the forward and backward delays are 1 second according to clock B, or equivalently, 1.1 second according to clock A. Then the forward and backward delays are 2.2−1=1.2 and 101−110=−9 seconds for the first packet. The forward and backward delays are 3.3−2=1.3 and 102−111.1=−9.1 seconds for the second packet. In this case, the estimated round trip delays are 1.2+(−9)=1.3+(−9.1)=−7.8 seconds.

Figure 4:
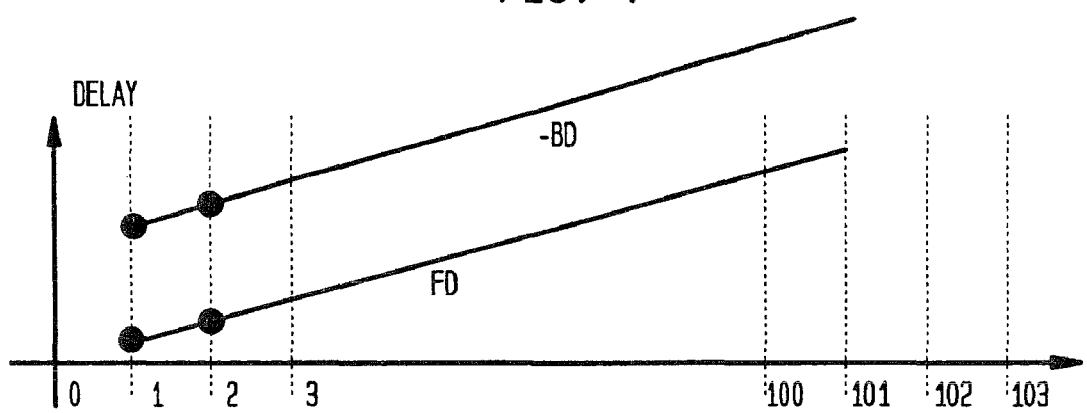
FIG. 4 shows a delay plot when only T1 timestamp is used with backward delay.

In the procedures described in patent application Ser. Nos. 09/920,138 and 10/157,610, when only T1 timestamp is used, the delay plot looks as shown in FIG. 4.

In normal event, the −BD line should be lower than the FD line, with the estimate of the round trip delay being the vertical distance between the two lines. For this example, the estimate of the round trip delay is −7.8 seconds.

Figure 5:
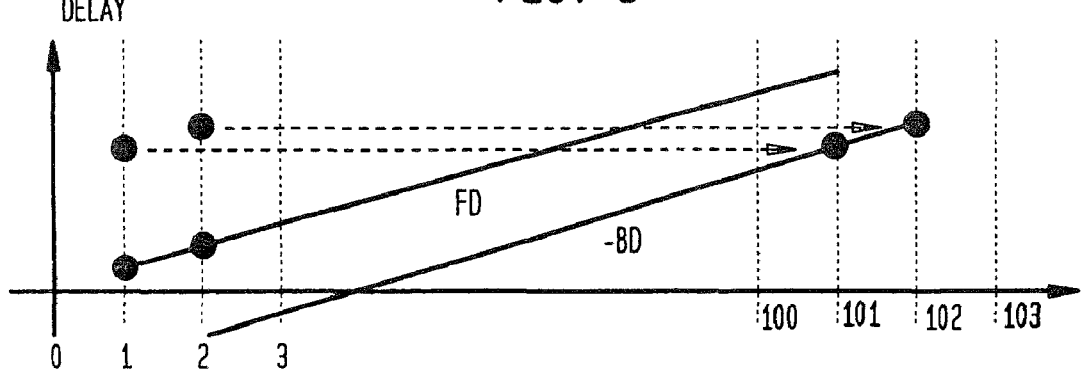
FIG. 5 shows a delay plot when the T4 timestamp is used with backward delay.

If the T4 time stamp is used with backward delay, then the delay plot looks as shown in FIG. 5.

Now the −BD line is lower than the FD line because backward delay points are shifted to the right following the T4 values. The forward delay for the 101st packet is 11.2 seconds. The estimate of the round trip delay is then 11.2+(−9) =2.2 seconds, a positive value.

This kind of negative effect becomes prominent when the packet processing delay, or T3−T2, is significantly longer than the actual packet delays, and the clocks are running at very different speeds. Using T4 timestamps provides a more accurate estimate for the offset and delay values.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. In one embodiment, the invention may be embodied in a tangible computer readable program storage medium readable by computer, tangibly embodying program code logic executable by the computer to perform method steps disclosed herein for calculating clock offset and skew in a computer system. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of calculating clock offset and skew in a computer system, the method comprising the steps of:
    sending data packets from a first processing unit in the computer system to a second processing unit in the computer system;
    sending the data packets from the second processing unit to the first processing unit;
    providing first time stamps to indicate when the packets leave the first processing unit;
    providing second time stamps to indicate when the packets arrive at the second processing unit;
    providing third time stamps to indicate when the packets leave the second processing unit;
    providing fourth time stamps to indicate when the packets arrive at the first processing unit;
    defining a set of backward delay points using the fourth time stamps, each of said backward delay points representing a point on a graph defined, on a first axis, by a respective one fourth time stamp, and on a second axis, by a backward delay value determined using said respective one fourth time stamp;
    calculating a clock offset between clocks on the first and second processing units and a skew of said clocks using said set of backward delay points.

2. A method according to claim 1, wherein the fourth time stamps specify locations on a graph for the set of backward delay points.

3. A method according to claim 1, wherein:
    the set of backward delay points comprises {T4($i$), −BD($i$)} where T4($i$) are the fourth time stamps, and −BD($i$) are backward delay values; and
    each backward delay value is calculated using a respective one set of the time stamps.

4. A method according to claim 1, further comprising the step of using the time stamps to define a set of forward delay points, and wherein the calculating step includes the step of using both the set of backward delay values and the set of forward delay values to calculate said clock offset and skew.

5. A method according to claim 1, wherein the step of defining a set of backward delay points includes the step of defining a set of negative backward delay points using the fourth time stamp.

6. A method according to claim 1, wherein the first processing unit provides the first and third time stamps, and the second processing unit provides the second and fourth time stamps.

7. A calculating system for calculating clock offset and skew in a computer system of the type wherein data packets are sent from a first processing unit in the computer system to a second processing unit in the computer system, and the data packets are sent from the second processing unit to the first processing unit, and wherein first time stamps are provided to indicate when the packets leave the first processing unit, second time stamps are provided to indicate when the packets arrive at the second processing unit, third time stamps are provided to indicate when the packets leave the second processing unit, and fourth time stamps are provided to indicate when the packets arrive at the first processing unit, the calculating system comprising a clock offset and skew calculation processing unit configured for:

defining a set of backward delay points using the fourth time stamps, each of said backward delay points representing a point on a graph defined, on a first axis, by a respective one fourth time stamp, and on a second axis, by a backward delay value determined using said respective one fourth time stamp; and calculating a clock offset between clocks on the first and second processing units and a skew of said clocks using said set of backward delay points.

8. A calculating system according to claim 7, wherein the fourth time stamps specify locations on a graph for the set of backward delay points.

9. A calculating system according to claim 7, wherein the set of backward delay points comprises {T4($i$), –BD(i)} where T4($i$) are the fourth time stamps, and –BD(i) are backward delay values.

10. A calculating system according to claim 9, wherein each backward delay value is calculated using a respective one set of the time stamps.

11. A calculating system according to claim 7, wherein the clock offset and skew calculation processing unit is configured for using the time stamps to define a set of forward delay points, and for using both the set of backward delay values and the set of forward delay values to calculate said clock offset and skew.

12. A calculating system according to claim 7, wherein the set of backward delay points defines comprises a set of negative backward delay points.

13. A tangible computer readable program storage medium readable by computer, tangibly embodying program code logic executable by the computer to perform method steps for calculating clock offset and skew in a computer system, said method steps comprising:

sending data packets from a first processing unit in the computer system to a second processing unit in the computer system;

sending the data packets from the second processing unit to the first processing unit;

providing first time stamps to indicate when the packets leave the first processing unit;

providing second time stamps to indicate when the packets arrive at the second processing unit;

providing third time stamps to indicate when the packets leave the second processing unit;

providing fourth time stamps to indicate when the packets arrive at the first processing unit;

defining a set of backward delay points using the fourth time stamps, each of said backward delay points representing a point on a graph defined, on a first axis, by a respective one fourth time stamp, and on a second axis, by a backward delay value determined using said respective one fourth time stamp; and calculating a clock offset between clocks on the first and second processing units and clock skews of said clocks using said set of backward delay points.

14. A program storage device according to claim 13, wherein the fourth time stamps specify locations on a graph for the set of backward delay points.

15. A program storage device according to claim 13, wherein the set of backward delay points comprises {T4($i$), –BD(i)} where T4($i$) are the fourth time stamps, and –BD(i) are backward delay values.

16. A program storage device according to claim 15, wherein each backward delay value is calculated using a respective one set of the time stamps.

17. A program storage device according to claim 13, further comprising the step of using the time stamps to define a set of forward delay points, and wherein the calculating step includes the step of using both the set of backward delay values and the set of forward delay values to calculate said clock offset and skew.

18. A program storage device according to claim 13, wherein the step of defining a set of backward delay points includes the step of defining a set of negative backward delay points using the fourth time stamp.

* * * * *